March 16, 1954   P. GRODZINSKI ET AL   2,672,046
APPARATUS FOR TESTING THE WEAR AND
ABRASION RESISTANCE OF MATERIALS Filed Dec. 21, 1949   2 Sheets-Sheet 1

Inventors.
Paul Grodzinski, &
Walter Richard Julius Jacobsohn.
By
Atty.

March 16, 1954   P. GRODZINSKI ET AL   2,672,046
APPARATUS FOR TESTING THE WEAR AND
ABRASION RESISTANCE OF MATERIALS
Filed Dec. 21, 1949   2 Sheets-Sheet 2
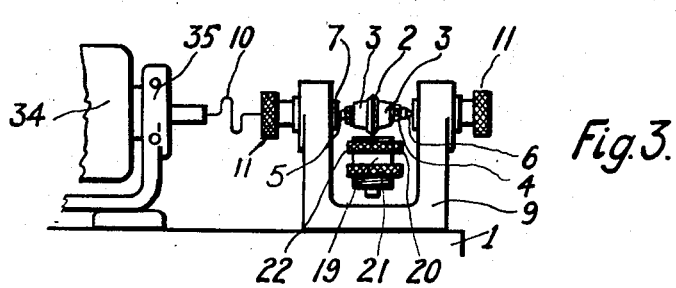
Fig. 3.
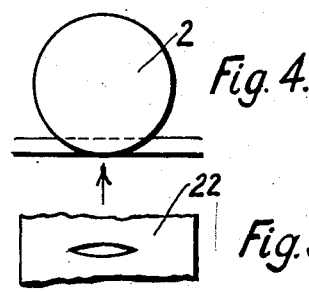
Fig. 4.
Fig. 5.
Fig. 8.
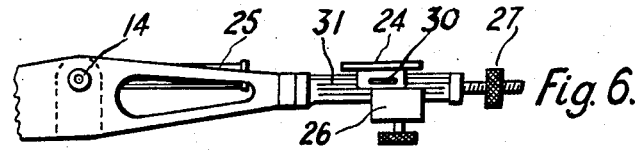
Fig. 6.
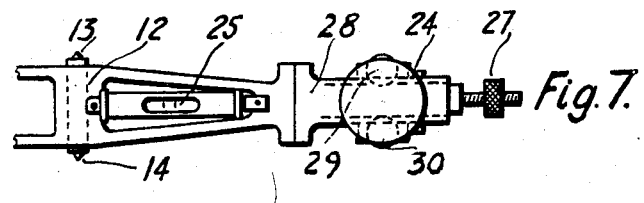
Fig. 7.
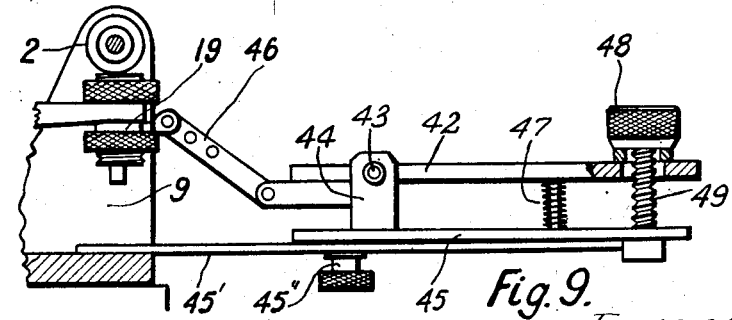
Fig. 9.
Inventors.
Paul Grodzinski, &
Walter Richard Julius Jacobsohn
By           Atty.

Patented Mar. 16, 1954

2,672,046

UNITED STATES PATENT OFFICE 2,672,046

APPARATUS FOR TESTING THE WEAR AND ABRASION RESISTANCE OF MATERIALS

Paul Grodzinski and Walter Richard Julius Jacobsohn, London, England

Application December 21, 1949, Serial No. 134,196

5 Claims. (Cl. 73—7)

The invention relates to apparatus for testing the wear and abrasion resistance of materials, in particular, that of hard and brittle substances, such as sintered carbides and synthetic or natural precious stones used, e. g. for bearings and tools. The apparatus may also be used for the testing of certain properties of abrasives, polishing materials, and lubricants.

The usefulness of industrial materials is usually determined by hardness tests, i. e. by making an impression of a body of a harder material on the softer surface of the specimen. Such tests are difficult or even impossible to carry out on very hard and brittle materials and very small specimens.

Microhardness tests with diamond points of certain shapes have solved some problems of nondestructive testing, but frequently failed when testing diamond. Known methods of abrasion testing with rotating discs under a distinct load are also not suitable for testing very hard materials. Such methods have been used, e. g. for testing building materials by rotating hard-metal discs, pressed against a fixed specimen. The depth of the cut obtained after a period of several minutes is measured by an indicator depth gauge and a check may be made against the reading from the depth gauge by measuring the length and width of the oblong impression with a microscope. The conditions laid down for such tests specify i. a. expressly that the peripheral speed of the disc must not be too great with due regard to vibrations, and the test period should not be too short though not longer than ten minutes. The relatively high pressures and low speeds combined with a fairly long duration of the abrasive action result in work-hardening of metal surfaces and in the shattering of mineral surfaces so that the method cannot be employed for the testing of small sintered carbide samples and is completely unusable as a non-destructive test for very small specimens, such as corundum or diamond. In general fairly big abrasions were caused, therefore such methods appear to be destructive for small pieces. Furthermore, fairly long test periods affect the abrasive power of the wheel and make comparison tests impossible.

One object of the invention is to provide a method for causing small abrasion marks to be made on hard and brittle materials, the hardness of which may equal the hardness of the abrading material.

It is another object of the invention to provide a method and apparatus for causing small abrasion marks to be made within comparatively short test periods using small loads not destructive to small and brittle specimen. According to the invention, extremely small abrasion marks of a certain shape are made by a disc rotating at very high speed under small loads for a comparatively short period. In this way, the abrasive power of the wheel is safeguarded remaining constant for a great number of tests. The rotational speed of the disc preferably lies between 6,000 R. P. M. and 10,000 R. P. M. for a disc of 1 to 2 in. diameter. The load on the disc is preferably between 20 and 500 g. and the duration of the test 3 to 30 sec., preferably 10 to 20 sec. Small abrasion marks of highly polished appearance are obtained, the length and width of which can be measured under the microscope and the depth e. g. by interferometric methods. The peripheral edge of the abrading disc is preferably of double conical cross-section so as to cause an abrasion mark of elongated boat-shape form. The disc may be a metal disc with or without an abrasive impregnated edge, or loose abrasive, as, e. g. diamond dust may be used for tests, e. g. on diamond. A single tooth milling cutter may also be used for producing micro-milling marks.

The apparatus for carrying out the method consists of an abrading disc, exchangeably mounted in a block on a base and connected to a power drive through a vibration absorbing device, a height adjustable specimen holder which may be fixed to one end of a balance lever oscillating in frictionless pivots whose other end carries a counter-weight arrangement for balancing the specimen holder and comprising a sliding platform to hold exchangeable weights for applying the test load to the specimen, and a compound slide arrangement in connection with the lever pivots to adjust the position of the specimen under the abrading disc.

A practical embodiment of the invention is illustrated by way of example in the accompanying drawing in which:

Fig. 1 is a side elevational view of the apparatus,

Fig. 2, a plan, and

Fig. 3, a part elevational view of the apparatus.

Figs. 4, 5 are diagrammatic views of the development and of the shape of an abrasion mark.

Figs. 6, 7 are side elevation and plan of part of the balance lever,

Fig. 8 is a longitudinal section through part of the disc and spindle arrangement.

Fig. 9 is a variation of the device for applying a load using direct feed.

Figure 1:
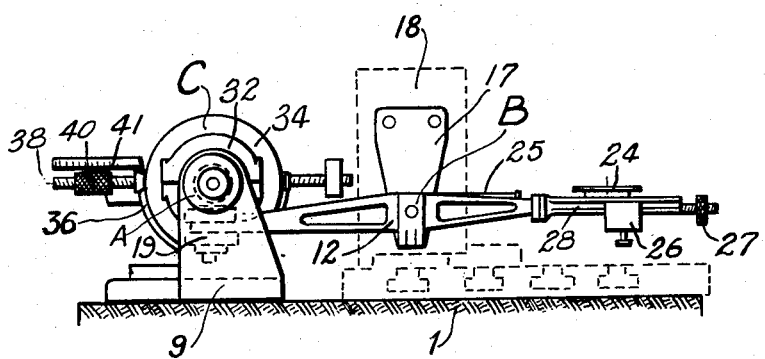
Figure 2:
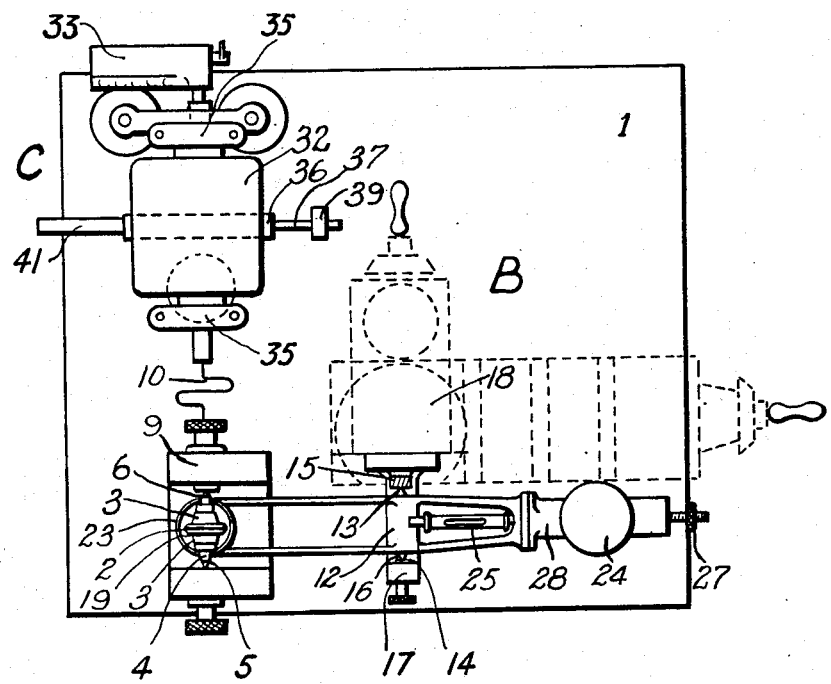

As shown in Figs. 1 to 3, a base plate 1 carries the three main units of the apparatus, namely, the abrading disc with spindle and bearing block A, the balance lever with test piece holder, counterweights and loading platform supported on a space-adjustable bracket B, the electric motor drive with revolution counter and torque measuring device C.

The abrading disc 2 (Fig. 8) exchangeably held between frustoconical clamping pieces 3 is preferably provided with a double conical abrading edge. Its material may be adapted to the kind of substance to be tested and to the purpose of the test, e. g. abrasive impregnated discs may be used or loose abrasive may be applied to a soft metal disc or a metal disc may be used without any abrasive. The spindle 4 of the disc is provided with hardened and ground conical centres 5, 6, running in countersunk fibre inserts 7, 8, in bearing block 9. Insert 7 has a central hole for the rotation transmitting S-shaped piano wire 10 to be fixed in conical centre 5 by a set screw. The lubrication is effected by grease boxes 11. Instead of the S-shaped wire connection between the motor shaft and spindle 4 any other vibration damping or absorbing device may be used.

The balance lever 12 is almost frictionless supported by ground conical sintered carbide centres 13, 14, in countersunk ground sintered carbide inserts 15, 16, in a bracket 17. Instead of these centres, miniature ball bearings may be used. Insert 15 is adjustably mounted in bracket 17 so as to facilitate the temporary removal or exchange of lever 12, e. g. for exchanging the specimen. The position of the lever 12 with regard to the abrasion disc 2 is accurately adjustable by mounting bracket 17 on a compound slide system 18 (not shown in detail) permitting angular and height adjustment of the lever axis, adjustment of the distance between the axis of the abrading disc and the lever axis and adjustment in a direction parallel to the axis of the abrading disc.

The tubular specimen holder 19 is vertically adjustably mounted on one end of balance lever 12 and secured in position by ring nuts 20, 21. The specimen is held on block 22 inserted in the tubular holder and clamped against an inwardly propecting rim 23 on its upper end. A graduation on this end facilitates angular adjustment of the specimen block 22 for directional abrasion tests.

Although the oscillating movements of the balance lever are usually only minute it is preferable to adjust the specimen in such a manner that the test surface and the surface platform 24 for carrying the load to be transmitted to the specimen for pressing it with a predetermined force against the abrading disc are in a horizontal plane with the axis of oscillation of the balance lever 12. A spirit level 25 is arranged on balance lever 12 facilitating accurate adjustment in combination with slidable counter-weight 26 for coarse, and ring nut 27 for fine adjustment to balance the weight of the specimen. Loading platform 24 is adjustable on counter-weight arm 28 by moving rubber discs 29 and 30 attached to platform 24 and rolling with slight friction in grooves 31 of arm 28. These rubber discs easily enable even minute adjustments of the platform centre along arm 28 and at the same time secure, by their resilient grip, platform 24 in the adjusted position, which is preferably determined by the varying distance of the point of contact between specimen and abrading disc 2 so as not to compel the operator to use fractional weights or loads.

The driving electric motor 32 is connected to the spindle 4 of the abrading disc 2 by an S-shaped piano wire 10 whose one end is inserted in a centre hole in the motor shaft and fixed thereto by a set screw, not shown. The other end of the motor shaft is connected to a revolution counter 33. The motor housing (stator) 34 is supported for rotary motion in ball bearings 35. A yoke 36 is screwed to the motor housing 34 with projecting rods 37, 38, for carrying balance weights 39 and 40, set so as to keep the motor housing stationary at a certain speed of the motor running idle. The additional torque exerted on the motor housing when running under load and tending to rotate the housing on contact of the abrading disc with the specimen is counterbalanced by shifting weight 40. The required additional leverage can be read from a graduated scale 41 on rod 38 and enables the calculating of the approximate value of the torque.

In some cases positive feed of the specimen towards the abrading disc may be required. Fig. 9 shows an embodiment of a positive feed consisting of a spring-loaded lever 42 pivotable about pin 43 on bracket 44 on base plate 45. Link 46 connects lever 42 and specimen holder 19. The base plate 45 can be temporarily fixed to block 9 on a slotted guide 45'. Its position may be adjusted by clamping screw 45''. The specimen is fed towards the abrading disc 2 against the pressure of spring 47 by turning graduated micrometer thimble 48 on screw 49 fixed to base plate 45.

*Operation.*—After inserting the desired abrading disc 2 the specimen is clamped in holder 19 setting a certain direction of the abrasion if required according to the graduation of the upper edge of the tubular holder. Then the point of contact between specimen and abrading disc 2 is determined and adjusted by suitable movements of the compound slide system. The centre of platform 24 is adjusted accordingly towards or away from the axis of oscillation of the balance lever requiring suitable correcting of the position of the counter-weights. Raising or lowering of the specimen follows by turning ring nuts 20, 21, until the surface of the specimen and the platform lie in a horizontal plane through the axis of oscillation. The lever assembly is raised till the specimen contacts the abrading disc. Finally the loading weight is placed on platform 24 and the motor started, controlling the speed by rheostat (not shown in the drawing). The abrasion time is controlled by a stop watch and the motor speed checked by observing a revolution counter. Automatic switches may be used for starting and stopping the rotation of the motor. Abrasion periods of 15 sec. have proved sufficient for obtaining reliable impressions on the hardest substances. Fig. 4 shows diagrammatically the disc working into the rising specimen to produce abrasion marks of the approximate shape as shown in Fig. 5. The length of the impression is later measured under a microscope and is indicative of the hardness or other properties of the specimen. The depth of very small abrasion marks as e. g. obtained on diamonds may be measured by interferometric methods and be used to determine the shape and size of the marks.

Practical tests have shown that it is possible with the method and apparatus according to the invention to determine e. g. the comparative hardness of diamonds using fine diamond dust in olive oil in connection with a cast iron disc of double conical shape of the abrading edge. The hardness of diamond could further be determined in relation to the orientation of the crystal.

Various changes may be made to the form of the invention herein shown and described without departing from the spirit of the invention or scope of the claims.

We claim:

1. Apparatus for testing the hardness of materials, in particular hard and brittle substances, comprising a rotatable abrading disk having a spindle supported in fixed bearings, a power drive connected to the disk through a vibration absorbing device, a specimen holder unit comprising a balance beam having a longitudinal axis disposed at right angles to the rotational axis of said spindle, a specimen holder vertically adjustably arranged at one end of said balance beam, the other end of said beam carrying a longitudinally slidable load platform, a compound slide mechanism adjustably supporting said balance beam, and resilient disks pivotally carried on opposite sides of said platform for rotation about vertical axes, said disks perimetrically resiliently engaging said beam for adjusting said platform longitudinally thereof.

2. Apparatus for testing the hardness of materials, in particular hard and brittle substances, comprising a rotatable abrading disk supported in fixed bearings, a power drive connected to the disk through a vibration absorbing device, a specimen holder unit comprising a balance beam having an opening at one end thereof, a tubular specimen holder vertically adjustably received in said opening, ring nuts threadedly carried by said holder on opposite sides of said beam, the other end of said beam carrying a longitudinally slidable load, and a compound slide mechanism adjustably supporting said balance beam.

3. Apparatus for testing the hardness of materials, in particular hard and brittle substances, comprising a base, a rotatable abrading disk supported in fixed bearings carried by said base, a power drive connected to the disk through a vibration absorbing device, a specimen holder unit comprising a balance beam, a specimen holder vertically adjustably arranged at one end of said balance beam, the other end of said beam carrying an exchangeable and longitudinally slidable load, a compound slide mechanism adjustably supporting said balance beam, and a specimen feeding assembly comprising a spring biased lever, a link pivotally connected to an end of said lever and to said holder, and a platform supporting said assembly secured to said base.

4. Apparatus for testing the hardness or wear resistance of materials, in particular hard and brittle substances, comprising a frame, a rotatable disk, a spindle supporting said disk and having hardened and ground conical centers on both ends, a bearing block carried by said frame providing fiber inserts for receiving said conical centers and supporting said spindle, a power drive for the spindle supported by said frame independently of said spindle, a vibration absorbing device connecting said power drive and spindle, a balance beam at right angles to said spindle, a compound slide system adjustably supporting said beam, said system comprising a vertical slide, a horizontal slide for adjustment of said beam parallel to the spindle axis, and a second horizontal slide for adjustment of said beam horizontally in a direction perpendicular to said spindle axis, a vertically adjustable specimen holder mounted on one end of said balance beam, and a slidable platform carried at the other end of said balance beam for receiving test loads.

5. Apparatus as set forth in claim 4 wherein said disk has an edge defined by the intersection of the bases of two opposed coaxial cones, said spindle carrying said disk between two frusto-conical clamping rings, one of said centers and its fiber insert containing central holes, and a connecting wire penetrating said openings and interconnecting said power drive and spindle.

PAUL GRODZINSKI.
WALTER RICHARD JULIUS JACOBSOHN.

References Cited in the file of this patent

UNITED STATES PATENTS

| Number | Name | Date |
| --- | --- | --- |
| 1,386,087 | Blankenhorn | Aug. 2, 1921 |
| 1,457,800 | Spindel | June 5, 1923 |
| 1,478,335 | Hudson et al. | Dec. 18, 1923 |
| 1,860,257 | Lundgren | May 24, 1932 |
| 2,101,718 | Moore | Dec. 7, 1937 |
| 2,117,073 | Wochner | May 10, 1938 |
| 2,314,287 | Pope | Mar. 16, 1943 |
| 2,402,340 | Parmenter | June 18, 1946 |

FOREIGN PATENTS

| Number | Country | Date |
| --- | --- | --- |
| 766,671 | France | Apr. 16, 1934 |
| 455,995 | Great Britain | Nov. 2, 1936 |
| 517,635 | Great Britain | Feb. 5, 1940 |